United States Patent [19]

Anstey

[11] 4,006,795
[45] Feb. 8, 1977

[54] MEANS FOR SEISMIC PROSPECTING FROM BULK LIQUID CARRIERS

[75] Inventor: Nigel A. Anstey, Sevenoaks, England
[73] Assignee: Seiscom Delta Inc.
[22] Filed: Apr. 27, 1972
[21] Appl. No.: 248,023
[30] Foreign Application Priority Data
  Apr. 28, 1971 United Kingdom ............ 11952/71
[52] U.S. Cl. .............................. 181/121; 181/114; 181/110
[51] Int. Cl.² ......................................... G01V 1/14
[58] Field of Search ........ 181/.5 MW, .5 A, .5 VM, 181/.5 R, 110, 111, 114, 121; 340/3 R, 3 T, 7 R, 18 R, 18 A

[56] References Cited
UNITED STATES PATENTS

| | | |
|---|---|---|
| 2,395,862 | 3/1946 | Freeman ............................ 340/3 T |
| 3,275,097 | 9/1966 | Davey ................................ 340/3 T |
| 3,430,727 | 3/1969 | Stronge ........................ 181/.5 VM |
| 3,696,329 | 11/1970 | Hazelhurst ............................ 340/7 |

FOREIGN PATENTS OR APPLICATIONS 826,932  1/1960  United Kingdom ............... 340/3 R

*Primary Examiner*—Nelson Moskowitz
*Attorney, Agent, or Firm*—Pravel, Wilson & Gambrell

[57] ABSTRACT

Apparatus for conducting seismic reflection surveys from oil tankers or other bulk liquid carriers in the course of their normal journeys. Seismic sources and detector apparatus are mounted in the ballast tanks. Pulse compression techniques may be used, and may take the form of a mechanical flail acting on the hull of the ship.

2 Claims, 3 Drawing Figures

SEISMIC SOURCE

MEANS FOR SEISMIC PROSPECTING FROM BULK LIQUID CARRIERS

BACKGROUND OF INVENTION

1. Field of Invention

The present invention relates to a method and apparatus for performing seismic reflection surveys from oil tankers or other bulk liquid carrier ships.

2. Description of Prior Art

Marine seismic surveys have ordinarily been made by vessels specifically adapted for the purpose. These vessels have four required items of equipment on board:

- a seismic source, or plurality of such sources, capable of generating a large acoustic pulse in the water,
- a "streamer" containing one or more acoustic detecting arrays, towed behind the vessel at some 15 meters below the sea surface,
- a set of digital recording equipment, by which the received seismic signals are recorded on magnetic tape, and displayed for visual assessment, and
- a positioning system, by which the vessel may accurately follow a desired course.

Such vessels were normally commissioned to perform surveys in areas known by other means to be generally prospective for hydrocarbon deposits. Since the use of these vessels for surveying was expensive, it was rare for such vessels to be used for reconnaissance in the broadest sense of exploring untested areas to find other generally prospective regions.

As interest grew in the regions beyond the continental shelves, it has become increasingly desirable to perform the broad reconnaissance function from other vessels plying across the continental shelves as part of their normal course.

Accordingly it has been proposed to use oil tankers for this purpose. The proposal is to equip them with a seismic source, a seismic streamer and a set of recording instruments, and to allow them to record continuous seismic traverses along their normal journeys. However, several difficulties existed in the direct transfer of the equipment from a seismic survey vessel to an oil tanker. The first such difficulty arose because of the greater speed of a large tanker: the tow noise generated in a streamer increased markedly wit increased speed through the water. The second difficulty arose in the handling of the streamer: the greater mechanical noise, the greater wake and the greater height of the tanker stern all militated against a short streamer (even for single-channel operation), and this meant an unwelcome amount of additional gear at the stern of the tanker. A third difficulty arose in the disposition of the source or sources: they had to be of a type deemed safe on a tanker (so that explosive or electric sources were undesirable), and the sources were not easy to stream at adequate depth at tanker speeds.

In face of these difficulties, it was proposed to adapt standard seismic techniques to tanker operation by streaming both the streamer and the sources from the side (rather than the stern) of the tanker. However, this also introduced major noise problems and major handling problems.

SUMMARY OF INVENTION

Briefly, the present invention provides a new and improved method and apparatus for performing seismic reflection surveys from oil tankers or other bulk liquid carrier vessels.

With the present invention, the seismic source and receiver apparatus are mounted in the vessel, overcoming the problems attendant to towing streamers and sources at the speeds at which tankers and bulk liquid carriers move.

Pulse compression techniques may be used to provide a seismic signal having lower peak power levels and longer duration to provide greater radiated energy and better signal-to-noise ratio without requiring dangerous peak power levels.

It is an object of the present invention to provide a new and improved method and apparatus for seismic reflection surveys.

It is an object of the present invention to provide a seismic surveying system on oil tankers, which system does not require use of a towed detecting streamer.

It is a further object to provide a system in which neither the detecting streamer nor the seismic source are towed from the ship.

DESCRIPTION OF PREFERRED EMBODIMENT

Figure 1:
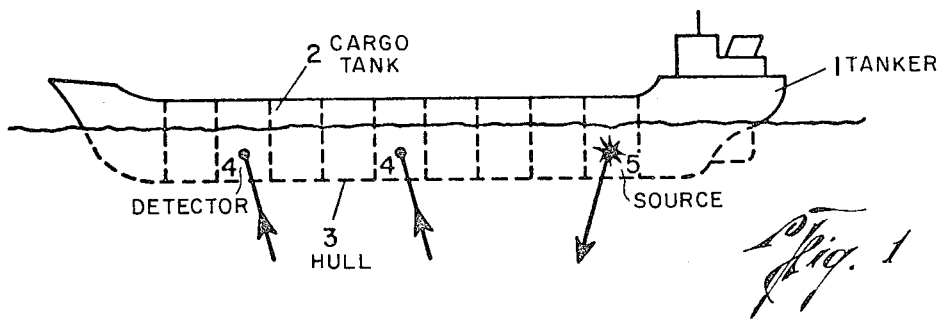
FIG. 1 is an elevation of a tanker in whose tanks are installed the elements of a seismic survey system of the present invention.

In the drawings a typical tanker in the 50,000 – 100,000 ton class for use in the present invention is illustrated at 1 in FIG. 1. However, it should be understood that the present invention may be adapted without change of principle to larger or smaller vessels. A typical tanker in the specified class would be some 250 meters in length and 30 meters in the beam, capable of making 17 knots for protracted periods. Of the length of such a ship or vessel, some 200 meters would be occupied by a plurality of cargo tanks 2 for bulk transports of oil, hydrocarbon, or other liquid. A typical vessel of the specified class has 30 of these tanks 2, arranged in three rows of ten; thus each tank would be 20 meters in length, with the center tank of the three tankers being about 13 meters wide and the port and starboard tanks being rather less wide. Each tank 2 is typically 16 meters deep, representing 13 meters of loaded draught and 3 meters of freeboard. The hull of the tanker 1 in the tank 2 is a single thickness 3 of steel, supported by ribs every 1½ – 2 meters or so. Of the tanks 2, several are maintained ordinarily as ballasts tanks filled with salt water, while the remainder carry cargo liquid. These salt water ballast tanks, therefore, are acoustically matched to the sea water, but are separated therefrom by 20 – 25 millimeters of reinforced sheet steel 3.

The acoustic match between the ballast water and sea water and the other factors set forth above permit installation of seismic detectors in the ballast tanks of the vessel 1. It should be understood that the seismic detectors may be installed in the oil tanks also, because of similar acoustic properties of oil and sea water. However, electrical connections to transducers within the oil tanks may be unacceptable for safety considerations if the tanks contained oil. Detectors could be used in these tanks, though, during the return journey, when the tanks ordinarily contain salt water.

It is preferable to use as many tanks as possible due to the desirability of recording with a spread of detectors, and of arranging in-line and transverse arrays of detectors for the improvement of the signal-to-noise ratio of the returned seismic signal. Thus the dimensions of a typical tanker 1 of the specified class allow a spread of five detecting stations, each representing an array 50 meters long and 30 meters wide. In other systems on other vessels, the array employed depends on the number of tanks which are permitted to be used. In FIG. 1 two detecting stations 4 are illustrated in tanks 2.

Figure 2:
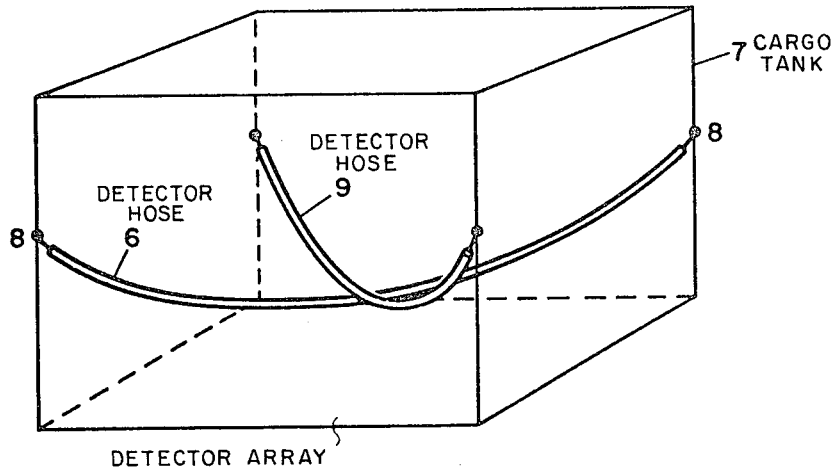
FIG. 2 is an isometric view of a cruciform detector array of the present invention installed in a tank of the tanker.

In each such tank 2, an array or sub-array of detectors is disposed in a manner to minimize the effect of structure-borne noise in the tanker 1 itself, of flow noise along the hull of the tanker 1, and of resonant systems established within the tank 2. A suitable disposition of detectors in a tank 7 is illustrated in FIG. 2. The detectors are piezoelectric elements of conventional tube or bender type. A plurality of such detectors — typically 20 — are arranged at suitable intervals within an oil-filled hose 6, to form what is known in the art as an "eel". The density of the eel 6 is adjusted to be only slightly greater than that of the liquid in the tank 7. The eel 6, of approximately 20 meters in length, is supported between two suspension points 8 on the diagonally-opposite vertical edges of the tank some 8 meters from the bottom of the tank; thus it follows an approximate catenary, of which the lowest point is made some 3 meters above the bottom of the tank 7. The detectors in the eel 6 are thus spaced over that part of the catenary between 3 and 8 meters from the bottom of the tank 7. A second eel 9, of the same configuration as the eel 6, is strung similarly across the other diagonal of the tank 7. Thus a cruciform three-dimensional array of detectors is obtained, having longitudinal and transverse dimensions approaching those of the tank 7, and a vertical dimension (of some 5 meters) arranged at a suitable distance below the surface of the fluid in the tank 7.

It should be understood that other systems of arranging the detectors within the tank 7 may be devised without departing from the scope of the invention; so long as an array well suited to the reception of seismic waves from below is provided, while tending to reduce the contribution from flow noise along the hull, structure-borne noise in the hull, sea-borne noise from the screws, surface waves on the liquid in the tank 7, and standing waves within the tank 7.

Ordinarily the electrical signals from the eels 6 and 9 are combined to form a single detector output. Similarly the outputs from detector arrays in several tanks may be combined to yield an effectively larger array. If the number of usable tanks allows, a spread may be established by the use of several such arrays along the length of the tank section of the ship 1.

The electrical outputs from the array or arrays are furnished to suitable recording instruments. These may be of standard type, recording the digitized output from gain-controlled amplifiers onto magnetic tape. The operation of such amplifiers is well known in the art, except for modification for the present invention of the setting of the frequency bands for the filters in the amplifiers. The lowcut filter is set to attenuate to an acceptable degree the cyclic noise generated by the ship's screw. For a 5-bladed propeller and a typical shaft speed of 115–120 revolutions/minute, this means providing significant attenuation at 10 Hz. The setting of the high-cut filter may be used to attenuate any tank resonances not sufficiently treated by the array dimensions. With the tank dimensions set forth above, the available frequency spectrum after setting the filter frequency bands remaining for utilization is about 15–50 Hz, which is well suited to seismic surveying.

As mentioned previously, the seismic survey end product from the arrays of detectors is a digital tape, which is later processed (into a form representing a cross-section of the earth) by computer techniques well known in the art. A rudimentary form of cross-sectional display may also be provided, as is usual, on shipboard to allow immediate monitoring of the quality of the results white the survey is performed.

A first type of source for the detecting system previously described may be a conventional type of source — sparker, boomer, air gun, gas gun, vibrator or any other — towed in the open water at the side of or behind the ship 1.

An alternative source is available if the ship 1 is propelled by steam turbines. In this case the steam supply may be used to drive any type of steam sound source. Such sources rely on the rapid generation of a bubble of steam in the water; the steam then condenses, and the bubble disappears without oscillation. The bubble may be formed under the ship, or at the end of a trailed hose.

In a preferred embodiment, the location of the source involves its installation within the ship 1. This may take the form of either of two alternatives. The first is obtained by mounting one or more conventional water-displacement sources within one or more of the tanks (as illustrated generally at 5 in FIG. 1). The second is obtained by arranging one or more mechanical impact devices (FIG. 3) to act substantially directly on the inside of the hull 3 of the ship 1.

A conventional impulse source may be used within a fluid-filled tank 2 of the ship 1 with few problems. As mentioned above, considerations of safety impose a preference for air guns or other sources not involving high voltages or combustible gases. One or more of such sources may then be suspended within a tank 2, with the supply hoses being conducted through one of the tank covers to the supply equipment mounted conveniently elsewhere on the vessel 1. Typically the tank or tanks 2 employed for this purpose would be toward the after end of the tank section of the ship 2 (as illustrated in FIG. 1), and the detecting tank or tanks 2 would be toward the forward end to minimize mechanical noise at the detectors, while allowing compressor or other generating equipment associated with the source to be located in or near the ship's engine room.

Although air guns of modest power can be discharged within a few meters of the plates of a ship without adverse effects, there is a power limit which it is undesirable to exceed. If adequate seismic penetration from the source cannot be obtained within this power limit, the present invention makes use of a pulse-compression system. Such systems, as is well known in the art, allow the replacement of the large peak power and short duration of an impulse source by the use of a signal having a smaller peak power and longer duration; thus they provide greater radiated energy (and therefore better signal-to-noise ratio after optimum processing) without requiring offensive or dangerous peak power levels. In the present invention, therefore, a pulse-compression system allows good seismic penetration without excessive displacement of the ship'-plates.

Another seismic source for use in the present invention involves the installation of a standard marine vibrator in an appropriate tank 2. In this system, the vibrator is driven by a quasi-sinusoidal control signal whose frequency sweeps from a lower frequency to a higher frequency (or the reverse) while forming the signal; the signal then repeats after a time greater than the greatest reflection time of interest. The control signal is generated by a digital function generator, or from magnetic memory, and the final reflection trace is obtained by cross-correlating the received signal against the control signal. This final reflection trace can offer the same seismic penetration as one obtained from an impulse source necessitating typically ten times as much displacement of the ship's plates.

The vibrator may be suspended from the top or sides of the tank 2, or from a moored buoy within the tank 2. The depth of operation of the vibrator is preferably in the range 6–10 meters below the surface of the liquid in the tank 2.

Another feature of the present invention, when the source and the detectors are contained within separated tanks 2 involves the provision of acoustic insulation in the tanks between them; this is of particular value with a pulse-compressive system, in that it reduces the amplitude of the direct signal (in whose presence the small reflection signal must be detected). This benefit may be obtained, without significant loss of the payload or the ballast effect of the tanks 2, by arranging a curtain of air bubbles within the intervening tanks. One convenient way of doing this is by lining the walls of the tanks 2 by closed-cell expanded rubber or the like, suitably protected to resist the chemical action of the liquid in the tank 2. The same technique may be used to reduce other unwanted acoustic transmission.

This partial isolation of the detectors from the source makes particularly attractive the use of a continuous seismic source instead of the swept-frequency vibrator mentioned above. The method of seismic prospecting using a continuous seismic source is described in British Patent No. 1233027, and several sources appropriate to the method are described in the companion British Patent No. 1233026.

In brief, the method of prospecting with a continuous source involves the transmission of a continuous random signal of suitable type, the reception of the reflected and refracted signal, the multiplication of each simple of the transmitted signal by each sample within a time range of the received signal, and the selective summing of the products to represent desired horizontal resolution and appropriate array dimensions. The transmitted signal may be obtained simply, as described in British Patent No. 1233027, by arranging a random shower of falling weights within a continuously-moving source.

Figure 3:
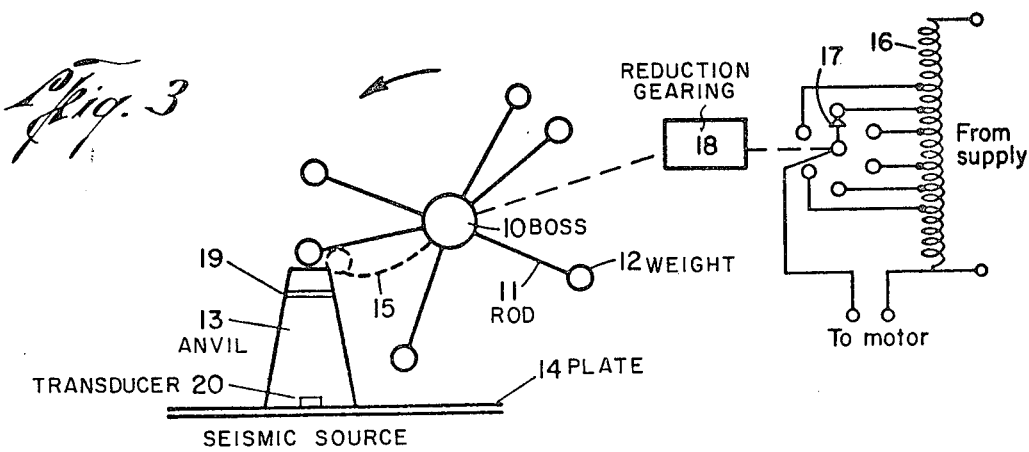
FIG. 3 is a schematic diagram of a continuous seismic source which may be used in one embodiment of the invention.

Another suitable seismic source of the present invention is shown in FIG. 3. To a revolving boss 10 are secured one or more flexible rods 11, each of which carries at its outer end a weight 12. The boss 10 is mounted on a shaft and driven by a motor (not shown) through suitable reduction gearing (not shown). In motion, therefore, the apparatus is the general form of a flail. An anvil 13 is placed to receive the impact of the rotating weights 12, and to transmit the resultant impulses to the plates 14 of the ship 1. The flexibility of the rods 11 is such that the apparatus may continue to rotate after impact, despite the fact that each ball 12 is momentarily checked; further rotation of the boss 10 allowed by this flexibility pulls the weight off the anvil as shown in phantom at 15.

The rods 11 are mounted in the boss 10 at irregular intervals, so that the sequence of impacts of the weight 12 with the anvil 13 within one revolution of the boss 10 is random. In a typical case there are a set of six of the weights 12 in one plane, as shown in the figure, and a further set of six weights, also randomly located, in a second plane (not shown) behind and adjacent to the first set. Thus a succession of twelve randomly-timed impulses is produced by each revolution of the boss 10. The dimensions of the apparatus are typically as follows:

| | |
|---|---|
| Radius to point of impact | 1 meter |
| Diameter of weight | 130 millimeters |
| Each weight | 10 kilograms |
| Separation between flail planes | 150 millimeters |
| Impact plate of anvil | 80 × 250 millimeters |
| Height of anvil | 700 millimeters |
| Mean period of revolution | 1 second |
| Mean time between impacts | 83 milliseconds |
| Weight velocity on impact | 6.3 meters/second |

Calculations based on these Figures show that the impact energy released by this source is equal to that of a conventional weight-drop truck operating every 30 seconds.

In the basic form described above, steady rotation of the boss 10 produces a series of impacts which repeats every 1 second. Since the energy released is ordinarily sufficient to secure reflections at greater travel-times than this, it is desirable to increase the period of the repetition without reducing the mean energy of the impacts. This may be done, for example, by driving the motor from a tapped auto-transformer 16 where the tap in use is selected by a rotating arm 17 driven from the main shaft through reduction gearing 18. Thus if there are ten taps and the reduction gearing is 10:1, the motor is driven at different speeds for ten successive revolutions, and then the cycle repeats. This allows without ambiguity the recording of reflections having a travel-time of 10 seconds. The taps may be connected in regular order, as shown in the Figure, or in an irregular manner. The combination of the number and arrangement of the taps, the gearing 18, the number of weights 12, the moment of inertia of the system, and the spacing of the arms 11 may be adjusted to produce a suitably random signal; the definition of such signals from auto-correlation functions having an acceptable side-lobe level being well known in the art.

The effective bandwidth of this seismic source is defined by the material of the weights 12, the material of the anvil 13, the mass and rigidity of the anvil-plate combination, and the sea water. it is ordinarily beneficial to mount the anvil 13 in a large unsupported area of the ship's plates 3; the plate resonance may be utilized (by mounting the anvil symmetrically between ribs) or minimized (by mounting it unsymmetrically). Additional compliance of the system to desired signal characteristics may be inserted, if desired, by including a layer of appropriate material in the anvil at 19.

The use of a continuous seismic source of this nature requires the recording of a facsimile of the outgoing acoustic signal. This is conveniently derived from a conventional transducer or motion detector mounted on the ship's plates at 20, or from a small array of such detectors spaced around anvil 13.

Other seismic sources, acting directly on the hull of the ship 1 or indirectly through liquid-filled tanks, may be used without departing from the scope of the invention.

The foregoing disclosure and description of the invention are illustrative and explanatory thereof, and various changes in the size, shape, and materials as well as in the details of the illustrated construction may be made without departing from the spirit of the invention.

I claim:

1. A seismic system for exploration of geological features beneath a body of water from a bulk liquid carrier having liquid containing cargo tanks comprising:
    a. weight means for forming the seismic signal upon impact with another body;
    b. anvil means mounted in a cargo tank of the ship for receiving the impact of said weight means to form the seismic signal;
    c. boss means for causing said weight means to strike said anvil means in a sequence of repetitive impacts in a periodic cycle;
    d. means for mounting said anvil means with the ship so that the impact of said weight means on said anvil means is transmitted into the body of water;
    e. means for increasing the period of repetitive impacts in the periodic cycle; and
    f. array means mounted in a cargo tank of the ship for sensing a seismic reflection signal returned from the geological strata.

2. A seismic signal source for forming seismic exploration siganls, comprising:
    a. weight means for forming the seismic signal upon impact with another body, said weight means comprising a plurality of weights;
    b. anvil means for receiving the impact of said weight means to form the seismic signal;
    c. boss means for causing said weight means to strike said anvil means in a sequence of repetitive impacts in a periodic cycle;
    d. means for mounting said plurality of weights at randomly spaced intervals with said boss means wherein said plurality of weights strike said anvil means at random time intervals; and
    e. means for increasing the period of repetitive impacts in the periodic cycle.

* * * * *